United States Patent [19]

Twerdochlib

[11] Patent Number: 4,970,670
[45] Date of Patent: Nov. 13, 1990

[54] TEMPERATURE COMPENSATED EDDY CURRENT SENSOR TEMPERATURE MEASUREMENT IN TURBINE BLADE SHROUD MONITOR

[75] Inventor: Michael Twerdochlib, Oviedo, Fla.

[73] Assignee: Westinghouse Electric Corp., Pittsburgh, Pa.

[21] Appl. No.: 277,832

[22] Filed: Nov. 30, 1988

[51] Int. Cl.$^5$ .............................................. G01K 1/20
[52] U.S. Cl. ................................ 364/571.03; 364/557; 374/163
[58] Field of Search .............. 364/557, 571.07, 571.04, 364/571.03, 508; 374/176, 163, 152, 172; 324/243, 239, 224, 202

[56] References Cited

U.S. PATENT DOCUMENTS

| | | | |
|---|---|---|---|
| 3,936,734 | 2/1976 | Brandli et al. | 324/243 X |
| 3,939,403 | 2/1976 | Stassart | 324/224 X |
| 4,173,869 | 11/1979 | Martin, Jr. et al. | 364/557 X |
| 4,181,961 | 1/1980 | Nopper | 324/202 X |
| 4,460,869 | 7/1984 | Buser et al. | 374/176 X |
| 4,468,968 | 9/1984 | Kee | 364/571.03 X |
| 4,518,917 | 5/1985 | Oates et al. | 324/243 X |
| 4,562,554 | 12/1985 | Stixroud et al. | 364/557 X |

Primary Examiner—Parshotam S. Lall
Assistant Examiner—S. A. Melnick

[57] ABSTRACT

A system for monitoring the temperature of a plurality of turbine blade shroud segments includes indicia carried by each shroud segment. A sensor produces input signals in response to the indicia. A temperature sensor measures the temperature of the sensor producing the input signals. A first circuit, responsive to the temperature sensor, corrects the input signals to compensate for the effects of temperature on the sensor. A second circuit determines the temperature of each shroud segment based on the corrected input signals.

11 Claims, 2 Drawing Sheets

TEMPERATURE COMPENSATED EDDY CURRENT SENSOR TEMPERATURE MEASUREMENT IN TURBINE BLADE SHROUD MONITOR

BACKGROUND OF THE INVENTION

1. Field of the Invention

The present invention is directed generally to systems for monitoring the operating parameters of a steam turbine generator and, more particularly, to systems for monitoring the temperature of the rotating parts within the turbine.

2. Description of the Prior Art

Most turbine blade rows are shrouded to provide some measure of sealing between the stationary and rotating portions of the turbine generator. Shroud segments are arc-shaped structures connected in series to form a circular shroud around the tips of the blades in a blade row. Each shroud segment is typically riveted to three or more blade tips. Thus, a number of shroud segments are needed to completely encircle a row of blades.

Experience has shown that shrouds can fail causing damage to themselves as well as other components of the turbine. One type of failure mode is a rub, common to many or all shroud segments within a row, which causes all the shroud segments in the row to heat up. Excessive heat and centripetal loading causes the shroud segments to yield radially. Such radial movement results in increased contact between the shroud segments and the seal thus generating more heat which results in more radial distortion of all shroud segments in a more or less even manner. One or more shrouds may malfunction as a result of a high temperature induced failure of the attachment mechanisms.

Another problem is caused by windage heating. Windage heating of the turbine blades and shroud segments is caused by friction when the gases in the turbine pass the blades and shroud segments. The turbine is designed such that under normal operating conditions windage heating is not a problem. However, under no load conditions the turbine's rotating components may rotate at excessive speeds thus subjecting the shroud segments (and blades) to excessive windage heating. It is desirable to know the temperatures reached by the shroud segments during such overspeed conditions so that stress, fatigue, and the like can be determined to anticipate future failures of those components.

Despite the desirability of monitoring the temperatures of the shroud segments, the harsh environment inside the turbine, extreme speeds at which the rotating portion of the steam turbine travels, and telemetry problems inherent in the use of temperature sensors carried by the rotating portion of the turbine have presented obstacles to the monitoring of those temperatures. Thus, the need exists for a system for monitoring the temperature of the turbine blade shrouds.

SUMMARY OF THE INVENTION

The present invention is directed to a system for monitoring the temperature of a plurality of turbine blade shroud segments. Each shroud segment carries indicia. A sensor produces input signals in response to the indicia. A temperature sensor measures the temperature of the sensor producing the input signals. A first circuit, responsive to the temperature sensor, corrects the input signals to compensate for the effects of temperature on the sensor. A second circuit determines the temperature of each shroud segment based on the corrected input signals.

According to one embodiment of the present invention the first circuit may multiply the input signal by a correction factor. The correction factor is based on the temperature of the sensor producing the input signals and may be obtained from a look-up table or by evaluating an equation which expresses the correction factor as a function of the temperature of the sensor producing the input signals.

According to another embodiment of the present invention the second circuit determines the temperature of each shroud segment based on the magnitude of the corrected input signals. A look-up table may store various shroud segment temperatures corresponding to various magnitudes of the corrected input signal. Alternatively, an equation expressing shroud segment temperature as a function of the magnitude of the corrected input signal may be evaluated.

The present invention is also directed to a method for monitoring the temperature of a plurality of turbine blade shroud segments comprising the steps of: sensing eddy currents generated in each shroud segment as a result of indicia carried by each shroud segment to produce input signals; measuring the temperature of the eddy current sensor; correcting the input signals based on the temperature of the eddy current sensor to compensate for the effects of temperature on the eddy current sensor; and determining the temperature of each shroud segment based on the corrected input signals.

The method and apparatus of the present invention provide a means for monitoring the temperature of each shroud segment with a non-contacting type of sensor which may be housed in the stationary portion of the turbine. These and other advantages and benefits of the present invention will become apparent from the Detailed Description of a Preferred Embodiment hereinbelow.

BRIEF DESCRIPTION OF THE DRAWINGS

In order for the present invention to be clearly understood and readily practiced, preferred embodiments will be described, by way of example only, with reference to the accompanying figures wherein.

DETAILED DESCRIPTION OF A PREFERRED EMBODIMENT

Figure 1:
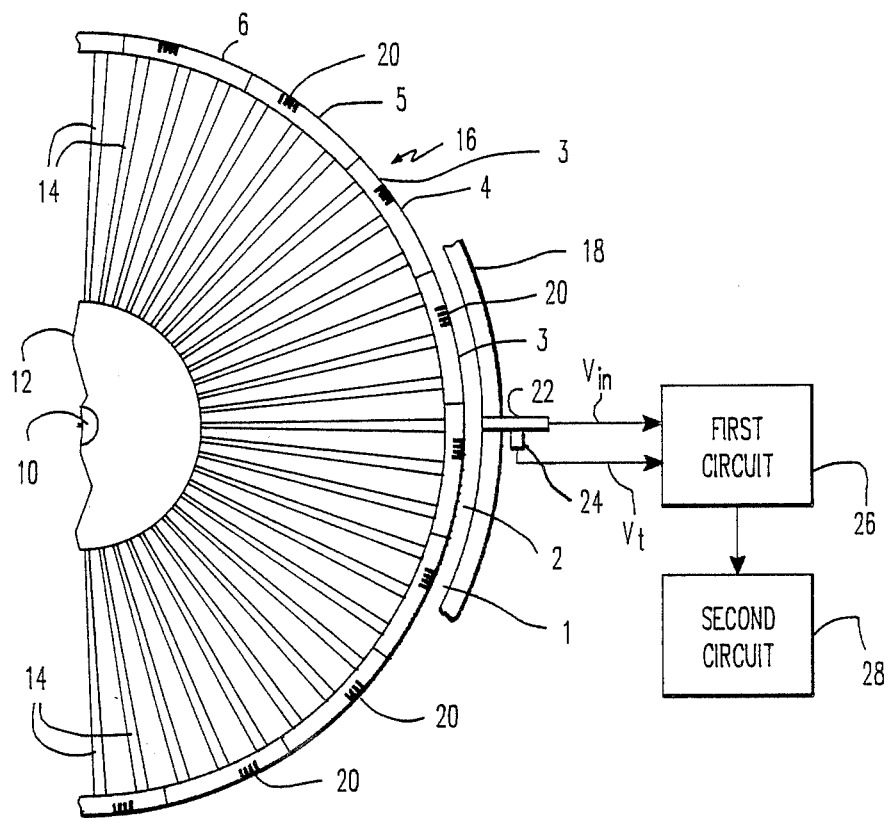
FIG. 1 illustrates a steam turbine having a shroud temperature monitor constructed according to the teachings of the present invention.

FIG. 1 illustrates a portion of a steam turbine generator having a shroud temperature monitor constructed according to the teachings of the present invention. In FIG. 1, a shaft 10 carries a rotor disc 12 to which are attached a plurality of turbine blades 14. Typically, three or more turbine blades are connected to a shroud segment. Six shroud segments, segments 1 through 6, are numbered in FIG. 1. The shroud segments are serially connected to form a continuous shroud 16 encircling the plurality of turbine blades 14. The shaft 10, disc 12, plurality of turbine blades 14, and shroud 16 make up a part of the rotating portion of the turbine. A stationary seal 18 is positioned between the rotating portion of the turbine and the stationary portion of the turbine.

In FIG. 1, a non-contact type of sensor 22 is responsive to eddy currents in each shroud segment to produce input signals Vin. The sensor is also responsive to indicia 20 carried by each of the shroud segments. The indicia 20 may include a plurality of closely spaced slits or a notch as disclosed in U.S. patent application Ser. No. 07/277,833 for a Turbine Blade Shroud Clearance Monitor Having Auto-Calibration, filed herewith and assigned to the same assignee as the present invention (WE case no. 54,471), which application is hereby incorporated by reference. A temperature sensor 24 is responsive to the temperature of the sensor 22 and produces a signal Vt representative of the sensor's 22 temperature.

The signals Vin and Vt are input to a sensor temperature correction circuit 26 whose function is to correct the input signals Vin to compensate for the effects of temperature on the sensor 22. The corrected input signals are input to a shroud temperature measurement/alarm circuit 28 whose function is to extract shroud segment temperature information from those signals. The circuit 28 may also output the shroud segment temperature information, store that information for future reference, or compare that information to set-points for the purpose of sounding alarms. The construction and operation of circuits 26 and 28 is discussed more fully hereinbelow.

The temperature monitor of the present invention may use the same eddy current sensor as that used in the clearance monitor of the aforementioned patent application to measure the temperature of each shroud segment within a blade row. That is accomplished by using the temperature dependence of the eddy current sensor measurement and the shallow indicia 20 (slits) cut into each shroud segment.

There are three physical factors that can effect the magnitude of the input signal Vin:

Factor A - the distance between the sensor 22 and the shroud 16;

Factor B - the temperature of the sensor 22;

Factor C - the temperature of each shroud segment.

Factor A is employed by the shroud lift detector of the aforementioned patent application and therefore need not be discussed further in this disclosure.

The present invention measures only the depth of the indicia 20 and hence is independent of the distance between the sensor 22 and the shroud 16. The size (magnitude) of the input signals Vin produced in response to the indicia 20 is therefore determined only by factors B and C. While there are other factors such as shroud metal type and sensor parameters that can effect the magnitude of the input signals Vin, they remain constant and therefore do not effect the present invention.

Figure 2:
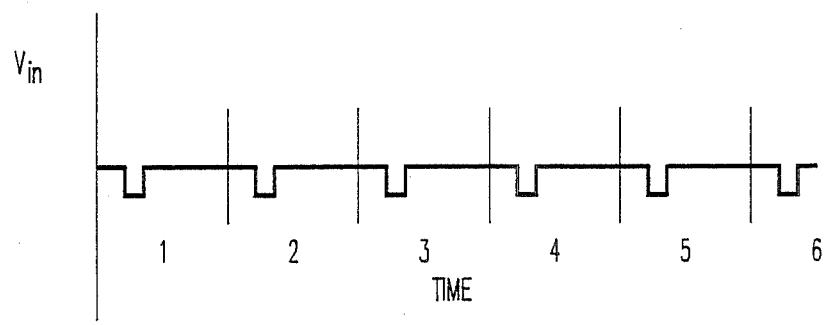
FIG. 2 is a graph illustrating the input signals produced by sensing eddy currents in each shroud segment.

A graph showing the magnitude of the input signals Vin produced by shroud segments 1 through 6 as a function of time is illustrated in FIG. 2. In FIG. 2, all shroud segments are shown as being at the same temperature. Factor B effects the magnitudes (amplitudes) of the input signals Vin through the influence of temperature on the coil(s) (not shown) of the sensor 22 and changes in the inductive and capacitive characteristics of the sensor 22 caused by thermal expansion within the sensor.

Figure 3:
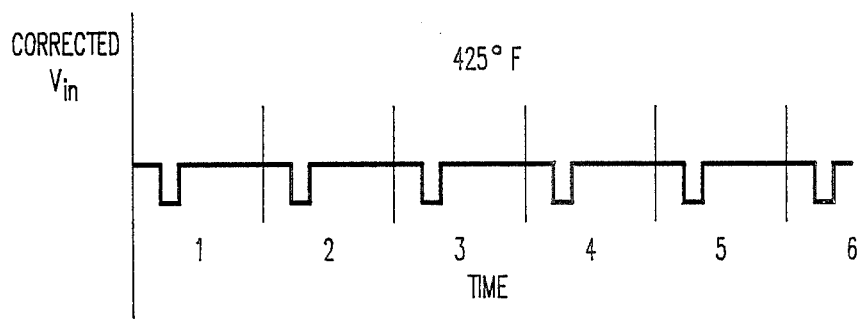
FIGS. 3 and 4 are graphs illustrating two examples of input signals which have been corrected to compensate for the effects of temperature on the eddy current sensor.
Figure 4:
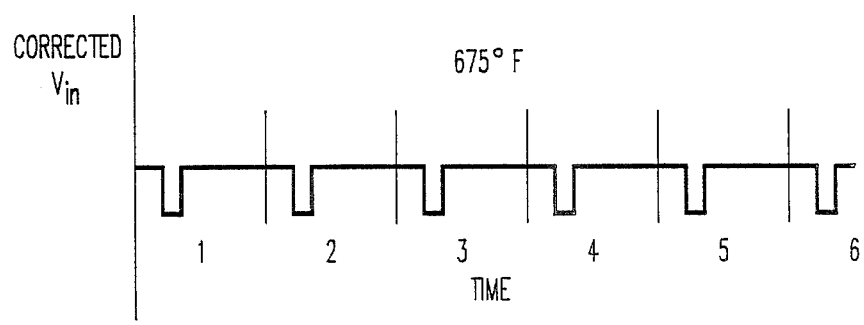

The temperature dependence of the sensor 22 may be determined by test if that information is not available from the sensor manufacturer. The temperature sensor 24, which may be a thermometer, permits the circuit 26 to scale the input signals Vin to eliminate the effect of factor B. That scaling, or correction, can be effected by multiplying the input signals Vin by a correction factor. FIGS. 3 and 4 illustrate two examples of scaled or corrected input signals which result from multiplying the signals shown in FIG. 2 by correction factors appropriate for 425° F. (218° C.) and 675° F. (357° C.), respectively.

The correction factor can be selected from a look-up table or it can be determined by evaluating an equation which expresses the correction factor as a function of the sensor's 22 temperature. Those of ordinary skill in the art will recognize that the functions of circuit 26 i.e. the selection of a correction factor and the multiplication of the input signals Vin by that correction factor, can be achieved by known circuits constructed of discrete components or an appropriately programmed microprocessor. The corrected input signals e.g. those shown in either FIG. 3 or FIG. 4, are then input to circuit 28.

Factor C affects the output of sensor 22 through the influence of temperature on the electrical conductivity of the shroud segments. Because the temperature dependence of shroud segment conductivity is well known, that is the temperature dependence of the conductivity of the metals from which the shroud segments are constructed are well known, and all other factors have been removed, the magnitude of the corrected input signals input to circuit 28 are representative of the temperature of each shroud segment. In the event other types of non-contact sensors are used, the shroud temperature information may be obtained from other characteristics of the corrected input signals such as frequency or the like.

The circuit 28 determines the temperature of each shroud segment based on the magnitude of the corrected input signals. The magnitude of the corrected input signals is determined by comparing the magnitude of the signal caused by the indicia to the magnitude of the signal caused by the shroud segment's surface. A look-up table may be provided for selecting the appropriate shroud segment temperature or an equation expressing shroud segment temperature as a function of the magnitude of the corrected input signals can be evaluated. Those functions of the circuit 28 can be accomplished through the use of well known electrical circuits or an appropriately programmed microprocessor.

After the shroud segment temperatures have been determined, they may be displayed, stored for future use, or compared to set-points for the purpose of sounding an alarm. The set-points may represent temperatures approaching those at which the shroud 16 can yield radially causing further rapid heating and failure of the shroud attachments or excessive windage heating which may weaken shroud and blade material. The set-points can be calculated from known mechanical properties of the shroud metal, the physical structure of the shroud segments, and the centripetal loading in the shroud segments. It may be desirable to store the temperatures reached by the shroud segments during overspeed conditions when windage heating of blades and shrouds may occur to determine what life has been consumed in the rotating parts of the turbine during such conditions.

The present invention is also directed to a method for monitoring the temperature of a plurality of turbine blade shroud segments comprising the steps of: sensing eddy currents generated in each shroud segment as a result of indicia carried by each shroud segment to produce input signals; measuring the temperature of the eddy current sensor; correcting the input signals based on the temperature of the eddy current sensor to compensate for the effects of temperature on the eddy current sensor; and determining the temperature of each shroud segment based on the corrected input signals.

The method and apparatus of the present invention provide a continuous and non-contacting measurement of the temperature of each shroud segment. The onset of shroud failure where there is no relative displacement between shroud segments can be detected as well as failures caused by high shroud temperatures. Pending shroud failures can be detected based on the temperatures of the shroud segments. The present invention can be incorporated into a shroud lift monitor of the type disclosed in the aforementioned patent application.

While the present invention has been described in conjunction with a preferred embodiment thereof, many modifications and variations thereof will be apparent to those of ordinary skill. This disclosure and the following claims are intended to cover all such modifications and variations.

What I claim is:

1. A system for monitoring the temperature of a plurality of turbine blade shroud segments, comprising:
    indicia means carried by each shroud segment;
    first sensor means for producing input signals in response to the plurality of shroud segments passing said first sensor means, said input signals having a variation in magnitude caused by said indicia means;
    temperature sensor means for measuring the temperature of said first sensor means;
    first circuit means responsive to said input signals and said temperature sensing means for producing scaled input signals, said scaled input signals being substantially free of the effects of temperature on said first sensor means; and
    second circuit means responsive to said first circuit means for determining the temperature of each shroud segment based on said scaled input signals.

2. The system of claim 1 wherein said first sensor means includes a non-contact type of sensor.

3. The system of claim 1 wherein said first circuit means includes means for multiplying said input signals by a correction factor to produce said scaled input signals, said correction factor being based on the temperature of said first sensor means.

4. The system of claim 3 wherein said first circuit means includes storage means for storing a table containing correction factors and means for selecting a correction factor from said table based on the temperature of said first sensor means.

5. The system of claim 3 wherein said first circuit means includes means for storing an equation which expresses the correction factor as a function of the temperature of said first sensor means and means for evaluating said equation.

6. The system of claim 1 wherein said second circuit means determines the temperature of the shroud segments based on the magnitude of said scaled input signals.

7. The system of claim 6 wherein said second circuit means includes storage means for storing a table containing shroud segment temperatures and means for selecting one of said shroud segment temperatures based on the magnitude of said scaled input signal.

8. The system of claim 6 wherein said second circuit means includes means for storing an equation which expresses shroud segment temperature as a function of the magnitude of said scaled input signals and means for evaluating said equation.

9. A steam turbine having a system for monitoring the temperature of a plurality of turbine blade shroud segments, comprising:
    a shaft;
    a row of turbine blades carried by said shaft;
    a plurality of turbine blade shroud segments carried on the ends of said turbine blades;
    a stationary seal surrounding said turbine blade shroud segments for reducing the amount of steam passing around said turbine blades;
    indicia means carried by each shroud segment;
    first sensor means positioned in said seal for producing input signals in response to said plurality of shroud segments passing said first sensor means, said input signals having a variation in magnitude caused by said indicia means;
    temperature sensor means for measuring the temperature of said first sensor means;
    first means responsive to said input signals and said temperature sensing means for providing scaled input signals, said scaled input signals being substantially free of the effects of temperature on said first sensor means; and
    second means responsive to said first means for determining the temperature of each shroud segment based on said scaled input signals.

10. The steam turbine of claim 9 wherein said second means includes means for storing the temperatures of said shroud segments.

11. A method for monitoring the temperature of a plurality of turbine blade shroud segments each carrying indicia means, comprising the steps of:
    sensing eddy currents generated in each shroud segment to produce input signals;
    measuring the temperature of the means for sensing the eddy currents;
    correcting the input signals based on the temperature of the means for sensing the eddy currents to compensate for the effects of temperature;
    determining the difference in magnitude between that portion of the corrected input signals responsive to the shroud segment and the magnitude of that portion of the corrected input signals responsive to the indicia means; and
    determining the temperature of each shroud segment based on said difference in magnitude.

* * * * *